March 11, 1969     H. STEUER     3,431,724
ONE-PIECE CHAIN LINK
Filed July 27, 1966
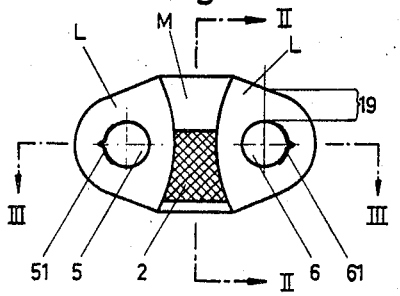
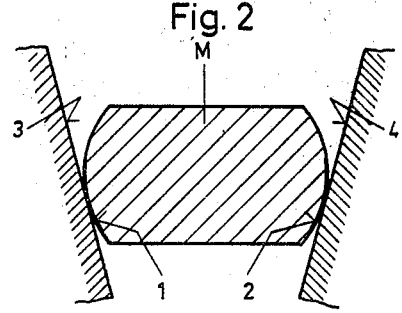
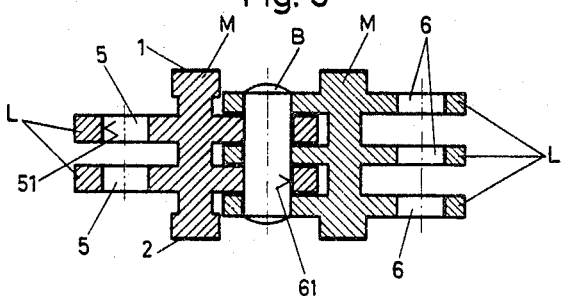
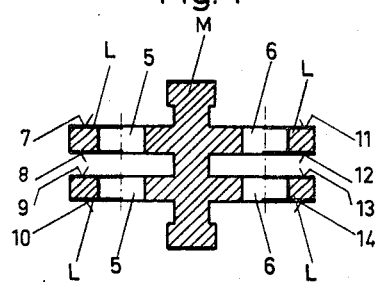
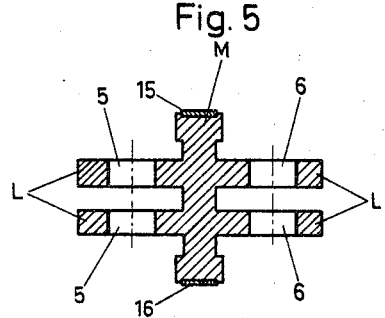
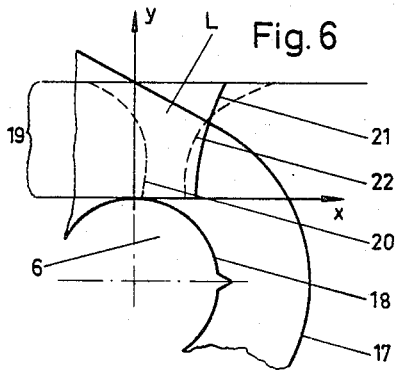
*INVENTOR.*
*HERBERT STEUER*
BY
*Bailey, Stephens & Huettig*
*ATTORNEYS*

United States Patent Office 3,431,724
Patented Mar. 11, 1969

3,431,724
ONE-PIECE CHAIN LINK
Herbert Steuer, Bad Homburg vor der Hohe, Germany, assignor to Reimers-Getriebe A.G., Zug, Switzerland, a corporation of Switzerland
Filed July 27, 1966, Ser. No. 568,167
Claims priority, application Germany, July 29, 1965, R 41,192
U.S. Cl. 59—35   6 Claims
Int. Cl. B21l 17/00

ABSTRACT OF THE DISCLOSURE

A one-piece link for an endless chain adapted to run between pairs of conical pulley discs in an infinitely variable transmission has a central friction-transmitting part provided with a hard wear-resistant surface. The link has side bars with bores therein adapted to receive pins passing through the bore and through bores in the side bars of other links. The side bars of adjacent interconnected links are stretched beyond the stretch-strain limit of the material to such an extent that the bores will be in alignment.

---

The present invention relates to a chain link consisting of a single piece of a metallic material for an endless chain of an infinitely variable cone pulley transmission in which this chain transmits the driving torque from a pair of conical driving discs to a driven pair of such disks by means of frictional forces acting between the smooth contact surfaces of these conical disks and the chain links. The present invention further relates to a method of producing a link chain which is composed of these chain links.

The endless chains of the known types of cone pulley transmissions which are equipped with serrated conical disks are only subjected to traction which is transmitted by laminations on the chain links which are slidable transversely to the chain and engage with the teeth of the conical disks. When the conical disks are provided with smooth contact surfaces, the transversely movable laminations are ommitted from the chain, but the chain links must then be provided with friction surfaces which are applied with considerable pressure against the smooth contact surfaces of the conical disks so as to transmit the torque by means of frictional forces from the pair of driving disks to the pair of driven disks.

While the tensile stresses upon such a chain may be easily controlled, it has always been a very difficult problem to reduce the wear which is caused by the friction upon the points of engagement between the contact surfaces of the chain links and those of the conical disks. Prior to this invention, attempts have been made to solve this problem by hardening the chain links on all sides or by covering the unhardened links with hardened steel rings, the outer surfaces of which form the contact surfaces between the chain links and the conical disks.

Both of these types of construction are, however, unsatisfactory. By hardening the chain links on all sides, their ability to withstand different stresses is reduced, whereas their sensitivity to impacts increases. Consequently, they easily break, especially their parts adjacent to the link-pin bores in the side bars. On the other hand, unhardened chain links which are enclosed by hardened steel rings are expensive to manufacture because they have to be made with the highest degree of accuracy so as to fit so tightly around the links that they will not break under the compression by the conical disks. Furthermore, the walls of the bores in the side bars of the links and the link pins therein become worn very quickly in the operation of the transmission.

It is a well-known fact that when chain links are hardened, they become distorted. The deviations in shape and dimensions which are thereby caused often have the effect that not all of the side bars of the links of the asembled chain will equally participate in the transmission of the traction since some of them do not fully engage with the link pins. Although in chains with unhardened links such deviations which might be due to inaccurate manufacture will soon be compensated by the quick wear upon the walls of the side-bar bores as the result of the tensile load upon the chain, such wear will also affect the reistance of the chain to torsion. Consequently, after the wear has once started, it will quickly progress with the result that the chain will become useless within a very short time.

Although the wear upon chain links which are hardened on all sides is relatively small, the unavoidable inaccuracies of manufacture and the distortion of such links which is caused by hardening them have the result that the bores in the individual side bars of adjacent links which are connected by link pins are not exactly in alignment with each other so that some of the side bars will then be excessively loaded, while others will only be lightly loaded.

This uneven load upon the individual side bars and the walls of their bores requires the load to which the chain may be subjected in the actual operation of the transmission to be reduced considerably below the load which would be theoretically possible if all the side bars of the chain links would be subjected to the same load. In the alternative, it would be necessary to increase the cross-sectional size of the side bars which would mean among many other disadvantages that the weight of the chain thus also its inertia and the resulting centrifugal force would be considerably increased.

It is an object of the present invention to provide a link chain which is designed so as to reduce the wear upon those parts of the chain links which are subjected to friction without increasing the danger of breakage of the links.

The link chain to which the present invention applies comprises a plurality of chain links each of which consists of a single piece of material and is provided at both sides of its central friction-transmitting part with side bars which are provided with link-pin bores and engage between and are connected to the corresponding side bars of the adjacent chain link by link pins which may be either of the cylindrical one-piece type or of the rocking-pin type. For attaining the above-mentioned object, the present invention provides that the material of these one-piece chain links is given a hard wear-resistant surface structure only at the particular points which are exposed to wear by friction and that at least a part of the material of the side bars remains malleable in the cold condition to such an extent that all of the bores in the side bars of the adjacent interconnected links may be brought in exact alignment with each other by being permanently deformed by a stretching operation.

Due to the malleability of their material, at least the side bars of the chain links therefore retain the property of being permanently deformed which permits variations in dimensions causing a nonalignment of all of the sidebar or link-pin bores to be eliminated so that all of the side bars will equally participate in the transmission of traction. The invention insures, however, that despite the malleability of the side bars, the wear resistance of those parts of the chain link which are subjected to the stresses as are caused by the transmission of the frictional forces in the operation of the chain will not be diminished.

This type of construction of the chain links in which some of the parts of each link, especially the side bars, are malleable for attaining an exact alignment of the link-pin bores in the different side bars has the further very important advantage that, if all of the side bars of the interconnected links are stretched beyond the elastic limit of the material, each side bar will be permanently prestressed. This prestressing reduces the local maxima of stresses which occur when the chain links are subjected to traction during the operation of the chain. This permits the chain links either to be subjected to a higher load or to be made of smaller cross-sectional dimensions since the local maxima of stresses which may occur during the operation of the transmission in the most endangered parts of the side bars adjacent to the bores will be substantially compensated by the preceding permanent stretching of all of the side bars which resulted in the prestressing therein.

If the cross-sectional dimensions of the chain links and especially the side bars are reduced as described above, not only the tensile load occurring in the operation of the chain will be uniformly distributed to all side bars, the walls of their bores, and the link pins therein, but a series of other important advantages will be attained, only some of which will hereafter be described: The mass of the chain and thus the inertia and centrifugal forces caused thereby will be reduced considerably inasmuch as the linear reduction of the dimensions is tantamount to a cubic reduction of the mass and inertia of the chain links and the entire chain. A chain of smaller outer dimensions but with the same transmitting properties and intended for transmitting the same maximum power by the transmission also permits such a transmission in its entirety to be built of a smaller size than was previously possible. In addition, the lower weight of the chain and the lower inertia thereof permit such a transmission to run at a higher relative speed which, in turn, means that for transmitting a certain maximum power, the transmission may be of smaller outer dimensions and be enclosed within a smaller housing.

The parts of each chain link adjacent to its contact surfaces with those of the conical disks of the transmission are preferably hardened. It is however, also possible to provide these contact surfaces of the chain links in the form of small plates of hard metal which are embedded in or secured to the outer sides of the chain link. It has also been found advisable to harden the material forming the traction-transmitting surfaces of the walls of the bores of the side bars. Furthermore, it is of advantage to harden the parts of the lateral surfaces of the side bars adjacent to the bores to such an extent that the chain link will still remain malleable and permit especially its side bars to be stretched.

Since the ductility of each of the inventive chain links as a whole is not noticeably affected by hardening its material at some points thereof, the invention permits the deviations in the dimensions of the chain links which may lead to an uneven distribution of the tensile load to the different side bars to be compensated in the course of the production of the chain. This may be attained according to the invention in such a manner that after the chain links have been assembled to form the chain, the latter is stretched in a cold condition beyond the stretching-strain limit of the material. If due to inaccurate manufacture, some of the side bars do not fully engage upon a link pin, the fully load-bearing side bars will be stretched more than the only partly load-bearing side bars until the differences in their dimensions will be eliminated and all side-bar bores will thereafter be in accurate alignment with each other.

If the stretching operation is exerted upon all side bars, the additional advantage will be attained that, after the stretching pull is relieved, a prestressing will remain within the area of the material adjacent to the bores of the side bars. Since in the operation of the chain, the tension of the latter and this prestressing counteract each other, the effective tractive force of the chain will not be built up until the value of this tension starts to exceed that of the prestressing. The absolute value of the tractive force which is proportional to the prevailing tension of the chain will then always be reduced by the constant value of the prestressing of the cross-sectional parts of each link which take up the traction and are located at both sides of the side-bar bores within a plane extending at right angles to the plane of traction of the chain.

The features and advantages of the present invention will become more clearly apparent from the following detailed description thereof which is to be read with reference to the accompanying drawings, in which the highly wear-resistant parts of the chain links are indicated by thicker lines and in which:

FIG. 1 shows a side view of a chain link according to the invention;

FIG. 2 shows a cross section which is taken within the plane of symmetry along the line II—II of FIG. 1 and illustrates the chain link in cooperation with the surfaces of a pair of conical pulley disks of an infinitely variable transmission;

FIG. 3 shows a cross section which is taken along the line III—III of FIG. 1 and illustrates two adjacent interconnected chain links one of which is provided with two side bars on each side and the other with three side bars on each side;

FIG. 4 shows a cross section of a chain link which is likewise taken along the line III—III of FIG. 1 and illustrates a modification of the invention, in which parts of the surfaces of the side bars are hardened;

FIG. 5 shows a cross section of another chain link which is likewise taken along the line III—III of FIG. 1 and illustrates a further modification of the invention, in which the contact points of the link with the conical disks are provided in the form of small hard-metal plates; while FIG. 6 shows a graph which illustrates the composition of stresses within the cross-sectional parts of the side bars at both sides of the bores which have to take up the traction after the chain has been stretched.

Each of the chain links according to the invention, as illustrated in FIGS. 1 to 5 consists of a central part M which extends at right angles to the direction of travel of the chain, and of flat plate-shaped side bars L which project from the opposite sides of the central part M and are provided with bores for the connection of the link to the adjacent link by means of a link pin B which may either be a cylindrical pin as shown in FIG. 3 or a rocking pin of a known type consisting of two parts which are adapted to rock on each other. Each of the chain links as shown at the left side of FIG. 3 and in FIGS. 4 and 5 is provided with two side bars L on each side of the central part M, while the following chain link, as shown at the right side of FIG. 3, is provided with three side bars L, the central bar of which projects between the two side bars of the other chain link, while the two outer side bars flank the two side bars of the other link at their outer sides. This chain link with three side bars is again followed by one with two side bars of the same type as illustrated in FIG. 3. It is therefore always necessary that five side-bar bores 5 and 6 of two adjacent chain links will be in exact alignment with each other if the total chain traction is to be uniformly distributed between the walls of all of the bores and to be uniformly transmitted from one chain link to the next.

Obviously, the chain links may also be provided with a larger number of side bars, for example, alternately with three and four side bars or more, in which case seven or a larger number of bores must be in exact alignment with each other so that all side bars will transmit equal components of the total chain traction.

The chain link according to FIGS. 1 to 3 is provided on both ends of the central part M with hardened contact surfaces 1 and 2 which, as indicated in FIG. 2, are adapted to engage upon the conical surfaces 3 and 4 of the conical pulley disks of a transmission. The contact surface 2 is indicated more clearly in FIG. 1 by cross-hatching. The surface parts 51 and 61 of the walls of bores 5 and 6 of each chain link which during the operation of the chain are subjected to pressure by the link pins B are likewise hardened.

FIG. 4 shows a chain link according to a modification of the invention, in which in addition to the hardened surfaces of each link according to FIGS. 1 to 3, the sections 7 to 14 of the lateral surfaces of the side bars are face-hardened to such an extent that the side bars as such still remain malleable. How far the outer end of each side bar should be hardened in the direction toward the plane of symmetry of the chain link, as indicated by the line II—II in FIG. 1, depends upon the requirements in each particular case.

FIG. 5 shows a further modification of the invention, in which the end surfaces of the central part M of each chain link which are adapted to engage upon the conical surfaces 2 and 3 of the conical disks as shown in FIG. 2, are not hardened as the corresponding surfaces of the links according to FIGS. 1 to 4, but provided with small hard-metal plates 15 and 16 which are preferably embedded in these surfaces.

FIG. 6 illustrates a diagram of the composition of stresses within the most endangered section of a side bar L adjacent to the bore 6, as indicated in FIG. 1 by the part 19 of the vertical line which extends through the center of the bore 6. FIG. 6 illustrates on an enlarged scale the part 17 which contains this most-endangered section 19 of each side bar L and a part 18 of the bore 6 in this side bar.

The horizontal tangent on the wall of bore 6, as shown in FIG. 6, may also be regarded as the abscicssa X on which the general tendency of the stresses occurring within the section in question is graphically illustrated. The ordinate y extends through the center of bore 6. The tensile stresses as indicated in FIG. 6 which are due to the relatively large diameter of the bore and the increasing width of the part 17 of the side bar adjacent to the area 19 of the side bar have been determined by calculations and tests.

The course of the stresses occurring within the section 19 of each side bar of a chain link during the transmission of traction from one chain link to the other is indicated in FIG. 6 by the dotted line 22. First it will be seen that a very strong stress peak occurs at the outer edge of the side bar within the section under consideration, although another stress peak, but of inferior importance also occurs within the area directly adjacent to the bore.

If the chain is subjected to a stretching operation, the stresses are built up in the section 19 in the same general direction as indicated by the line 22. After the stretching tension is relieved, however, a residual stress remains, as indicated by the curve 20 in FIG. 6, which is due to the fact that the material has been stretched beyond the stretch-strain limit. This curve 20 shows that after the stretching tension has been relieved, a prestressing remains within the section 19 especially near the outer edge of the side bar.

If a chain with such links is thereafter subjected to traction during the operation of the transmission, the value of the stress which is produced by the chain traction in accordance with line 22 and the value of the residual stress in accordance with line 20 which remains from the stretching operation are added to each other. The composition of stresses which actually occurs is therefore the result of the addition of the value of the stress which is caused by the traction of the chain during the operation thereof and extends approximately along the line 22 in FIG. 6 and of the value of the residual stress which remains from the stretching operation and follows approximately the line 20 in FIG. 6. The result occurring during the operation of the chain is a composition of stresses which extends approximately in accordance with the fully drawn line 21 in FIG. 6 which indicates that the stress peak according to line 22 is considerably reduced so that the stresses will be distributed much more uniformly within the endangered section of the side bar L along the ordinate y. The equalization of the stress which is caused by the preceding stretching of the material and by the resulting prestressing results in the best possible utilization of the side-bar material adjacent to the bore and especially of the most endangered cross-sectional area of the side bar as indicated by the ordinate y.

What has been said above regarding the section 19 of the side bar adjacent to the bore 6 of course also applies to the diametrically opposite section.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A metallic one-piece chain link for an endless chain adapted to run between two pairs of conical pulley discs of an infinitely variable cone pulley transmission and to transmit the driving torque from the pair of conical surfaces of said discs and said links, said link having a central friction-transmitting part and a plurality of side bars with bores therein at the opposite sides of said central part adapted to interengage with the side bars of adjacent links and to be connected thereto by link pins within said bores, wherein only those points of the materials of said link which are subjected to friction during the operation of the chain are provided with hard wear-resistant surfaces, all side bars of the adjacent interconnected links being stretched beyond the stretch-strain limit of the material to such an extent that all side-bar bores of adjacent interconnected links will be in alignment with each other.

2. A chain link as defined in claim 1, in which after the stretching operation each of said side bars has a prestressing therein adapted to reduce the stress peaks occurring within the links when subjected to the traction of the operation of the chain.

3. A chain link as defined in claim 1, in which the material of at least the outer surfaces of said central part forming its contact surfaces with the conical surfaces of the conical disks are hardened.

4. A chain link as defined in claim 1, further comprising small hard-metal plates secured to said central part of said link and forming the contact surfaces of said link with the conical surfaces of the conical disks.

5. A chain link as defined in claim 1, in which the traction-transmitting parts of the wall surfaces of said bores are also hardened.

6. A method of producing an endless chain for an infinitely variable cone pulley transmission and adapted to transmit the driving torque from a pair of conical driving disks to a pair of conical driven disks of said transmission by means of frictional forces acting between the smooth contact surfaces of said disks and the links of said chain, each of said links consisting of a single piece of metal having a central friction-transmitting part and a plurality of side bars on the opposite sides of said central part and interengaging with the side bars on one side of an adjacent link, each of said side bars of each link having a bore in a position substantially corresponding to the position of the bore in at least one other side bar on the same side of said link, and link means in said bores of the side bars of two adjacent links for pivotally connecting them to each other, the opposite outer ends of said central part of each link forming the contact surfaces thereof adapted to engage with said disks, said outer ends and all other points of each link which are subjected to friction during the operation of said transmission having hard, wear-resistant surfaces, while at least a part of the material of said side bars is still malleable, said method comprising the operation of stretching said chain in a cold condition beyond the stretch-strain limit of all of said side bars of said links whereby, when said transmission is in operation, the walls of the bores in all of said side bars of each pair of interconnected links will be placed permanently in accurate alignment with each other and in engagement with said link means connecting the same so that the tensile stresses occurring in said chain during the operation of said transmission will be uniformly transmitted by the walls of said bores in all side bars of one link to the walls of the bores in all side bars of the adjacent link through the link means connecting said two links.

References Cited

UNITED STATES PATENTS

| 1,551,764 | 9/1925 | Muller | 74—255 |
| 2,293,029 | 8/1942 | Focke | 74—255 |

FOREIGN PATENTS 190,762  8/1956  Austria.

CHARLES W. LANHAM, *Primary Examiner.*

G. P. CROSBY, *Assistant Examiner.*

U.S. Cl. X.R.

59—78, 90; 74—255